(12) United States Patent
Hachiya

(10) Patent No.: US 7,309,976 B2
(45) Date of Patent: Dec. 18, 2007

(54) DC/DC CONVERTER HAVING AN INTERNAL POWER SUPPLY

(75) Inventor: Shogo Hachiya, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 376 days.

(21) Appl. No.: 11/155,290

(22) Filed: Jun. 17, 2005

(65) Prior Publication Data

US 2006/0001409 A1    Jan. 5, 2006

(30) Foreign Application Priority Data

Jul. 2, 2004    (JP) .............................. 2004-196326

(51) Int. Cl.
    *G05F 1/00*    (2006.01)
(52) U.S. Cl. ........................ 323/282; 323/282; 323/222
(58) Field of Classification Search ................ 323/282, 323/283, 265, 222, 238, 266, 321, 318, 322, 323/325, 285, 303, 269, 317, 274
    See application file for complete search history.

(56) References Cited

U.S. PATENT DOCUMENTS

| 5,528,132 | A |   | 6/1996 | Doluca |
|---|---|---|---|---|
| 5,939,871 | A | * | 8/1999 | Tanaka ........................ 323/285 |
| 6,057,675 | A |   | 5/2000 | Tateishi |
| 6,236,194 | B1 | * | 5/2001 | Manabe et al. .............. 323/274 |
| 6,246,555 | B1 | * | 6/2001 | Tham ........................... 361/18 |
| 6,294,903 | B1 | * | 9/2001 | Yamashita et al. ........... 323/282 |
| 6,366,066 | B1 | * | 4/2002 | Wilcox ......................... 323/282 |
| 6,677,735 | B2 | * | 1/2004 | Xi ............................... 323/273 |
| 6,847,231 | B2 | * | 1/2005 | Kinugawa et al. ............ 326/82 |
| 6,958,596 | B1 | * | 10/2005 | Sferrazza et al. ............ 323/303 |
| 2003/0178976 | A1 | * | 9/2003 | Xi ............................... 323/273 |

FOREIGN PATENT DOCUMENTS

| JP | 07-336999 | 12/1995 |
|---|---|---|
| JP | 11-332222 | 11/1999 |

\* cited by examiner

*Primary Examiner*—Bao Q. Vu
*Assistant Examiner*—Nguyen Tran
(74) *Attorney, Agent, or Firm*—Keating & Bennett, LLP

(57) ABSTRACT

A DC/DC converter in which the DC output set voltage can be raised includes a switching transistor arranged to input an external power supply voltage, a smoothing circuit, a switching control circuit to which the internal power supply voltage is supplied and arranged to control the switching transistor, a comparison circuit arranged to compare the DC output voltage with a first reference voltage and to output a selecting signal, first and second linear transistors arranged to input the external power supply voltage or DC output voltage in accordance with the selecting signal, and to output the voltage according to the internal power supply control voltage as the internal power supply voltage, and an error amplification circuit arranged to input the internal power supply voltage, compare the internal power supply voltage with the second reference voltage, amplify the error thereof, and output the internal power supply control voltage.

18 Claims, 2 Drawing Sheets

DC/DC CONVERTER HAVING AN INTERNAL POWER SUPPLY

BACKGROUND OF THE INVENTION

1. Field of the Invention

The present invention relates to a DC/DC converter for dropping an external power supply voltage to be input by turning a switching transistor ON/OFF so as to acquire a predetermined DC output voltage.

2. Description of the Related Art

One type of a DC/DC converter uses a method of installing a switching transistor and dropping an external power supply voltage by turning the switching transistor ON/OFF so as to output a predetermined DC voltage. This switching type DC/DC converter has been widely used since it is compact and is highly efficient (e.g., Japanese Patent Application Laid-Open No. H7-336999, Japanese Patent Application Laid-Open No. H11-332222). Generally, for a switching type DC/DC converter, a linear regulator for outputting an internal power supply voltage, with which normal operation of a switching control circuit for controlling the switching transistor is guaranteed, is used (e.g., U.S. Pat. No. 5,528,132).

FIG. 2 shows an example of a conventional DC/DC converter. In this DC/DC converter 101, the switching transistor 111 turns ON/OFF according to the switching control signal which is output by the switching control circuit 113, so that the external power supply voltage $V_{IN}$ to be input is dropped through the subsequent smoothing circuit 112, and DC output voltage $V_{OUT}$ is output from the DC output terminal OUT. The switching control circuit 113 feeds back and inputs the DC output voltage $V_{OUT}$, and controls the switching transistor 111 based on this input. The external power supply voltage $V_{IN}$ is input to the linear regulator 116, and in the ON status (unless the later mentioned comparison circuit 114 changes the status to OFF), the linear regulator 116 supplies a constant DC voltage to the switching control circuit 113 as the internal power supply voltage $V_{DD}$. The comparison circuit 114 compares the DC output voltage $V_{OUT}$ with the reference voltage $V_{REF}$, and turns the switch 115 OFF and turns the linear regulator 116 ON if the DC output voltage $V_{OUT}$ is lower than the reference voltage $V_{REF}$. If the DC output voltage $V_{OUT}$ is higher than the reference voltage $V_{REF}$, the comparison circuit 114 turns the switch 115 ON and turns the linear regulator 116 OFF.

When this DC/DC converter 101 is started up at the rise of the external power supply voltage $V_{IN}$, the internal power supply voltage $V_{DD}$ is supplied from the linear regulator 116 since the linear regulator 116 is ON. When the DC output voltage $V_{OUT}$ rises and becomes higher than the reference voltage $V_{REF}$, the switch 115 turns ON and the linear regulator 116 turns OFF by the output of the comparison circuit 114. Then the DC output voltage $V_{OUT}$ is supplied as the internal power supply voltage $V_{DD}$. Also, the DC output voltage $V_{OUT}$ rises up to the DC output set voltage and stabilizes, that is, it enters normal operation status.

If the total current flowing through the switching control circuit 113 is $I_s$ (e.g., about 10 mA), and if the linear regulator 116 is in ON status (at startup), the power consumed by the linear regulator 116 and the switching control circuit 113 is $V_{IN} \times I_s$ (e.g., about 200 mW if $V_{IN}$ is about 20V). If the linear regulator 116 is in OFF status (during normal operation), the power consumed by the linear regulator 116 is 0, and the power consumed by the switching control circuit 113 is $V_{OUT} \times I_s$ (e.g., about 55 mW if $V_{OUT}$ is about 5.5V). The DC output voltage $V_{OUT}$ is lower than the external power supply voltage $V_{IN}$, so the power consumption during normal operation is decreased.

However in this DC/DC converter 101, where the DC output set voltage is relatively high (e.g., about 7V), this voltage is applied to the switching control circuit 113 as the internal power supply voltage $V_{DD}$ during normal operation. If the switching control circuit 113 is integrated in a semiconductor integrated circuit, and if the semiconductor integrated circuit is manufactured in an ordinary fabrication process, that is a fabrication process with a low voltage-resistance, the power supply voltage that can be applied thereto is low (e.g., about 5.5V), which is even lower if a fine process is used. Therefore, the DC output set voltage must be low to fabricate a semiconductor integrated circuit using an ordinary fabrication process. In order to set the DC output set voltage relatively high, a semiconductor integrated circuit integrating a switching control circuit 113 with many elements must be fabricated using a process with a high voltage-resistance, but manufacturing cost increases since the chip size and process cost increase.

SUMMARY OF THE INVENTION

To solve the above-described problems, a preferred embodiment of the present invention provides a DC/DC converter that integrates a switching control circuit in a semiconductor integrated circuit fabricated by an ordinary fabrication process with a low voltage-resistance even if the DC output set voltage is high.

A DC/DC converter according to a preferred embodiment of the present invention is a DC/DC converter for acquiring a predetermined DC output voltage by dropping an external power supply voltage to be input, the DC/DC converter including a switching transistor arranged to pass the external power supply voltage intermittently by turning ON/OFF according to a switching control signal, a smoothing circuit arranged to acquire the DC output voltage by smoothing the output of the switching transistor, a switching control circuit to which an internal power supply voltage is supplied for outputting the switching control signal based on the feedback-input DC output voltage, a comparison circuit arranged to compare the DC output voltage with a first reference voltage and outputting a selecting signal in a first or second status, an error amplification circuit arranged to compare the feedback-input internal power supply voltage with a second reference voltage, amplify an error thereof and output an internal power supply control voltage, a first linear transistor which turns ON when the selecting signal is in the first status and which inputs the external power supply voltage and outputs a voltage according to the internal power supply control voltage as the internal power supply voltage, and a second linear transistor which turns ON when the selecting signal is in the second status and which inputs the DC output voltage and outputs a voltage according to the internal power supply control voltage as the internal power supply voltage.

It is preferable that the switching control circuit of this DC/DC converter is integrated in a semiconductor integrated circuit fabricated by a fabrication process with a voltage-resistance lower than that of the second linear transistor.

According to a preferred embodiment of the present invention, the DC/DC converter includes the first and second linear transistors arranged to output the voltage according to the internal power supply control voltage as the internal power supply voltage in accordance with the selecting signal, so the internal power supply voltage to be applied to the switching control circuit does not become high regardless the DC output set voltage. As a result, the switching control circuit can be integrated in a semiconductor integrated circuit fabricated by an ordinary fabrication process with a low voltage-resistance even if the DC output set voltage is high.

Other features, elements, characteristics and advantages of the present invention will become more apparent from the following detailed description of a preferred embodiment of the present invention with reference to the attached drawing.

DETAILED DESCRIPTION OF THE PREFERRED EMBODIMENTS

Figure 1:
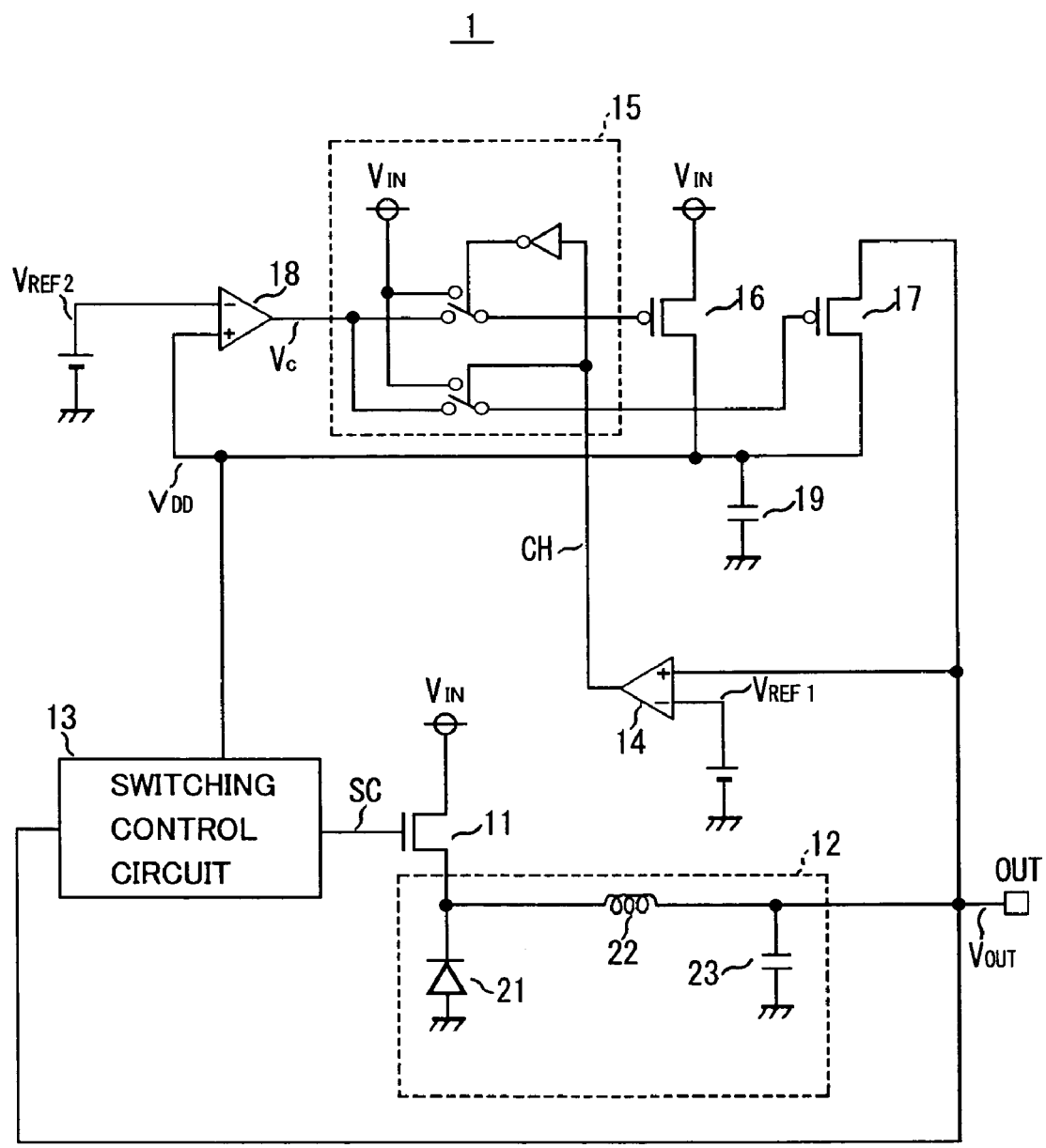
FIG. 1 is a circuit diagram depicting a DC/DC converter according to a preferred embodiment of the present invention.
Figure 2:
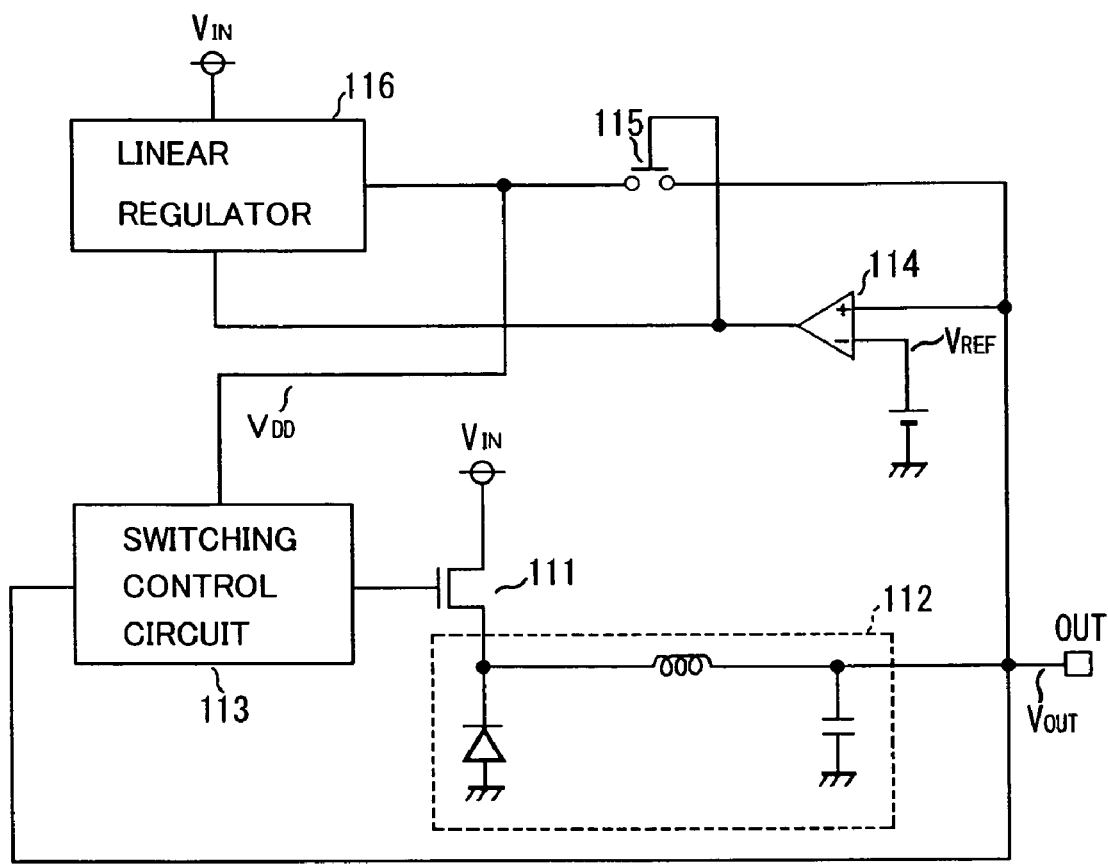
FIG. 2 is a circuit diagram of a conventional DC/DC converter.

A preferred embodiment of the present invention will now be described with reference to the drawing. FIG. 1 is a circuit diagram depicting a DC/DC converter according to a preferred embodiment of the present invention. In this DC/DC converter 1, the external power supply voltage $V_{IN}$ (e.g., about 20V) is input and dropped, and the DC output voltage $V_{OUT}$ is output from the DC output terminal OUT. A load (not illustrated) is connected to the DC output terminal OUT, and power is supplied from the DC/DC converter 1.

Element 11 is a switching transistor, which is preferably an N-type MOS transistor, where the switching control signal SC is input to the control end, that is the gate, and the external power supply voltage $V_{IN}$ is input to the input end, that is the drain. The external power supply voltage $V_{IN}$ is intermittently passed by turning the switching transistor 11 ON/OFF according to the switching control signal SC. Element 12 is a smoothing circuit that is arranged to acquire the DC output voltage $V_{OUT}$ by smoothing the voltage of the output end, that is the source, of the switching transistor 11. The DC output voltage $V_{OUT}$ is output from the DC output terminal OUT, and power is supplied to the load (not illustrated). Specifically, the smoothing circuit 12 has a diode 21 of which a cathode is connected to the source of the switching transistor 11 and an anode is grounded, a coil 22 of which one end is connected to the source of the switching transistor 11, and a capacitor 23 of which one end is connected to the other end of the coil 22 and the other end is grounded, and the other end of the coil 22 is connected to the DC output terminal OUT. Element 13 is a switching control circuit to which the internal power supply voltage $V_{DD}$ is supplied, and the switching control signal SC is output based on the DC output voltage $V_{OUT}$ which is fed back and input, and the switching transistor 11 is controlled by the switching control circuit 13.

Element 14 is a comparison circuit in which the DC output voltage $V_{OUT}$ is input to the non-inversion input terminal, the first reference voltage $V_{REF1}$ (e.g., about 4.5V) is input to the inversion input terminal, these two inputs are compared, and according to the result, the low level (first status) or the high level (second status) of the selecting signal CH is output from the output terminal. Element 15 is a select switch in which the internal power supply control voltage $V_C$ is input from the later mentioned error amplification circuit 18, and when the selecting signal CH is at a low level, the internal power supply control voltage $V_C$ is output to the gate of the later mentioned first linear transistor 16 and the external power supply voltage $V_{IN}$ is output to the gate of the later mentioned second linear transistor 17 so as to turn it OFF. When the selecting signal CH is at a high level, the external power supply voltage $V_{IN}$ is output to the gate of the first linear transistor 16 so as to turn it OFF, and the internal power supply control voltage $V_C$ is output to the gate of the second linear transistor 17.

The first linear transistor 16 is preferably a P-type MOS transistor, where the external power supply voltage $V_{IN}$ is input to the input end, that is the source, and when the selecting signal CH is at a low level, the first linear transistor 16 is turned ON by the select switch 15, and outputs the voltage according to the internal power supply control voltage $V_C$ which is input to the control end, that is the gate, from the output end, that is the drain, as the internal power supply voltage $V_{DD}$. The second linear transistor 17 is a P-type MOS transistor, where the DC output voltage $V_{OUT}$ is input to the input end, that is the source, and when the selecting signal CH is at a high level, the second linear transistor 17 turns ON by the select switch 15, and outputs the voltage according to the internal power supply control voltage $V_C$ which is input to the control end, that is the gate, from the output end, that is the drain, as the internal power supply voltage $V_{DD}$. Element 18 is an error amplification circuit in which the internal power supply voltage $V_{DD}$ is fed back and input to the non-inversion input terminal, and the second reference voltage $V_{REF2}$ (e.g., about 5V) is input to the inversion input terminal, these two inputs are compared, the error thereof is amplified, and the internal power supply control voltage $V_C$ is output from the output terminal. Element 19 is a capacitor that is arranged to stabilize the internal power supply voltage $V_{DD}$.

Now the operation of the DC/DC converter 1 will be described. At startup immediately after the external power supply voltage $V_{IN}$ rises, the DC output voltage $V_{OUT}$ is roughly at the ground potential, so the comparison circuit 14 outputs a low level. Therefore, in the first linear transistor 16, the internal power supply control voltage $V_C$ is input to the gate, and the voltage according to this is output as the internal power supply voltage $V_{DD}$. The second linear transistor 17, on the other hand, turns OFF since the external power supply voltage $V_{IN}$ is input to the gate. So the internal power supply voltage $V_{DD}$ is supplied from the external power supply voltage $V_{IN}$ via the first linear transistor 16. The internal power supply voltage $V_{DD}$ is compared with the second reference voltage $V_{REF2}$ in the error amplification circuit 18, and so as to make the error thereof become zero, the error amplification circuit 18 and the first linear transistor 16 operate. As a result, the internal power supply voltage $V_{DD}$ becomes roughly the same as the second reference voltage $V_{REF2}$.

The switching control circuit 13, to which the internal power supply voltage $V_{DD}$ is supplied, outputs the high level or low level of the switching control signal SC to control the switching transistor 11, and as a result the DC output voltage $V_{OUT}$ gradually rises. When the DC output voltage $V_{OUT}$ rises and becomes higher than the first reference voltage $V_{REF1}$, the comparison circuit 14 outputs the high level. The first linear transistor 16, where the external power supply voltage $V_{IN}$ is input to the gate, turns OFF, and the second linear transistor 17, where the internal power supply control voltage $V_C$ is input to the gate, outputs the voltage according to this internal power supply control voltage $V_C$ as the internal power supply voltage $V_{DD}$. Therefore, the internal power supply voltage $V_{DD}$ is supplied from the DC output terminal OUT via the second linear transistor 17. As mentioned above, the internal power supply voltage $V_{DD}$ is compared with the second reference voltage $V_{REF2}$ in the error amplification circuit 18, and so as to make the error thereof become zero, the error amplification circuit 18 and the second linear transistor 17 operate. At this time, if the DC output voltage $V_{OUT}$ is lower than the second reference voltage $V_{REF2}$, the internal power supply voltage $V_{DD}$ becomes roughly the same as the DC output voltage $V_{OUT}$, and if the DC output voltage $V_{OUT}$ is higher than the second reference voltage $V_{REF2}$, the internal power supply voltage $V_{DD}$ becomes roughly the same as the second reference voltage $V_{REF2}$.

When the DC output voltage $V_{OUT}$ further rises and reaches a predetermined DC voltage (DC output set voltage) (e.g., about 5.5V), the DC output voltage $V_{OUT}$ stabilizes (enters normal operation status), but the internal power supply voltage $V_{DD}$ at this time is supplied from the DC output terminal OUT. Even if the DC output set voltage is set high (e.g., about 7V or more), the internal power supply voltage $V_{DD}$ does not become higher than the second reference voltage $V_{REF2}$.

By supplying the DC output voltage $V_{OUT}$ via the second linear transistor 17, the internal power supply voltage $V_{DD}$, to be applied to the switching control circuit 13, does not become high, regardless of the DC output set voltage. Therefore, even if the DC output set voltage is set high, the switching control circuit 13 can be integrated in a semiconductor integrated circuit fabricated by an ordinary fabrication process with a low voltage-resistance (a voltage-resistance lower than that of the second linear transistor 17). A high voltage-resistance is demanded for the second linear transistor 17, where the corresponding cost increase is small. Also, compared with the DC/DC converter 101 described in the description of the related art, the error amplification circuit 18 is always ON, so the overall power consumption increases for this amount, but the number of elements constituting the error amplification circuit 18 is small, so this increase is minimal.

In the DC/DC converter 1, the capacitor 19 is effective for stabilizing the internal power supply line, but can be omitted if this can be compensated by a parasitic capacitance. The internal power supply voltage $V_{DD}$ is directly input to the non-inversion terminal of the error amplification circuit 18, but may be input after attenuation by resistance dividing.

The DC/DC converter according to a preferred embodiment of the present invention was described above, but the present invention is not limited to this preferred embodiment, but various design changes are possible within the scope of the matters stated in the claims. For example, the diode 21 of the smoothing circuit 12 can be replaced with a transistor which turns ON/OFF in the opposite way as the switching transistor 11 if a synchronous rectification type is used. Also, one or both of the first and second linear transistors 16 and 17 may be replaced with an N-type MOS transistor. In this case, it is designed such that the ground potential is input to the gate when the N-type MOS transistor is turned OFF. The configuration of the select switch 15 can be freely selected as long as the select switch 15 operates the first and second linear transistors 16 and 17 as described above.

While the present invention has been described with respect to preferred embodiments, it will be apparent to those skilled in the art that the disclosed invention may be modified in numerous ways and may assume many embodiments other than those specifically set out and described above. Accordingly, it is intended by the appended claims to cover all modifications of the invention which fall within the true spirit and scope of the invention.

What is claimed is:

1. A DC/DC converter for acquiring a predetermined DC output voltage by dropping an external power supply voltage to be input, comprising:
    a switching transistor arranged to pass the external power supply voltage intermittently by turning ON/OFF according to a switching control signal;
    a smoothing circuit arranged to acquire the DC output voltage by smoothing the output of the switching transistor;
    a switching control circuit to which an internal power supply voltage is supplied and which is arranged to output the switching control signal based on the feedback-input DC output voltage;
    a comparison circuit arranged to compare the DC output voltage with a first reference voltage and output a selecting signal in a first or second state;
    an error amplification circuit arranged to compare the feedback-input internal power supply voltage with a second reference voltage, to amplify an error thereof and to output an internal power supply control voltage;
    a first linear transistor which turns ON when the selecting signal is in the first status and which inputs the external power supply voltage and outputs a voltage according to the internal power supply control voltage as the internal power supply voltage; and
    a second linear transistor which turns ON when the selecting signal is in the second status and which inputs the DC output voltage and outputs a voltage according to the internal power supply control voltage as the internal power supply voltage.

2. The DC/DC converter according to claim 1, further comprising:
    a select switch which outputs the internal power supply control voltage to a control end of the first linear transistor and turns the second linear transistor OFF when the selecting signal is in the first status and which turns the first linear transistor OFF and outputs the internal power supply control voltage to a control end of the second linear transistor when the selecting signal is in the second state.

3. The DC/DC converter according to claim 2, wherein the first and second linear transistor are P-type MOS transistors, and the select switch outputs the external power supply voltage to the first or second linear transistor so as to turn either of the first and second linear transistors OFF.

4. The DC/DC converter according to claim 1, wherein the selecting signal is in the first status when the DC output voltage is lower than the first reference voltage and is in the second status when the DC output voltage is higher than the first reference voltage.

5. The DC/DC converter according to claim 1, wherein in the first state, the selecting signal is at a low level and in the second state, the selecting signal is at a high level.

6. The DC/DC converter according to claim 1, wherein said switching control circuit is integrated in a semiconductor integrated circuit fabricated by a fabrication process with a voltage-resistance lower than that of the second linear transistor.

7. The DC/DC converter according to claim 1, wherein the switching transistor is an N-type MOS transistor arranged such that the switching control signal is input to a gate of the N-type MOS transistor and the external power supply voltage is input to a drain of the N-type MOS transistor.

8. The DC/DC converter according to claim 1, wherein the smoothing circuit includes a diode, a coil and a capacitor.

9. The DC/DC converter according to claim 1, wherein the switching transistor is controlled by the switching control circuit.

10. The DC/DC converter according to claim 3, wherein the P-type MOS transistor defining the first linear transistor includes a gate, a source, and a drain, and the external power supply voltage is input to the source, and when the selecting signal is at a low level, the first linear transistor is turned ON by the select switch, and outputs from the drain as the internal power supply voltage the voltage according to the internal power supply control voltage which is input to the gate.

11. The DC/DC converter according to claim 3, wherein the P-type MOS transistor defining the second linear transistor includes a gate, a source, and a drain, and the DC output voltage is input to the source, and when the selecting signal is at a high level, the second linear transistor is turned ON by the select switch, and outputs from the drain as the internal power supply voltage the voltage according to the internal power supply control voltage which is input to the gate.

12. The DC/DC converter according to claim 1, further comprising a capacitor that is arranged to stabilize the internal power supply voltage.

13. The DC/DC converter according to claim 1, wherein when the DC output voltage reaches a DC output set voltage, the DC output voltage stabilizes and the internal power supply voltage at this time is supplied from a DC output terminal OUT.

14. The DC/DC converter according to claim 13, wherein the internal power supply voltage does not become higher than the second reference voltage.

15. The DC/DC converter according to claim 1, wherein the internal power supply voltage does not become higher than the second reference voltage.

16. The DC/DC converter according to claim 1, wherein the smoothing circuit includes a transistor that is arranged to turn ON/OFF in a way that is opposite to the turning ON/OFF of the switching transistor.

17. The DC/DC converter according to claim 1, wherein at least one of the first and second linear transistors is a P-type MOS transistor.

18. The DC/DC converter according to claim 1, wherein at least one of the first and second linear transistors is an N-type MOS transistor.

* * * * *